US007480917B2

(12) United States Patent
Richmond et al.

(10) Patent No.: US 7,480,917 B2
(45) Date of Patent: Jan. 20, 2009

(54) USER INTERFACE FOR EDITING OBJECTS OF A NETWORK OBJECT DATABASE

(75) Inventors: James P. Richmond, Newfields, NH (US); Steven Charles Bir, Lee, NH (US); David Scott Grieve, Durham, NH (US); Brian Stanley Locke, Lee, NH (US); Christopher McClain, Dover, NH (US); Daniel Timothy Murphy, Lee, NH (US)

(73) Assignee: Enterasys Networks, Inc., Andover, MA (US)

( * ) Notice: Subject to any disclaimer, the term of this patent is extended or adjusted under 35 U.S.C. 154(b) by 556 days.

(21) Appl. No.: 10/627,327

(22) Filed: Jul. 25, 2003

(65) Prior Publication Data

US 2004/0205072 A1  Oct. 14, 2004

Related U.S. Application Data

(60) Provisional application No. 60/428,584, filed on Nov. 22, 2002.

(51) Int. Cl.
*G06F 9/54* (2006.01)
*G06F 13/00* (2006.01)

(52) U.S. Cl. ...................... 719/313; 709/224
(58) Field of Classification Search ................. 719/313; 709/224
See application file for complete search history.

(56) References Cited

U.S. PATENT DOCUMENTS

| 5,774,667 | A | * | 6/1998 | Garvey et al. | 709/222 |
|---|---|---|---|---|---|
| 5,821,937 | A | * | 10/1998 | Tonelli et al. | 715/853 |
| 6,041,349 | A | * | 3/2000 | Sugauchi et al. | 709/223 |
| 6,456,306 | B1 | * | 9/2002 | Chin et al. | 715/810 |
| 6,732,170 | B2 | * | 5/2004 | Miyake et al. | 709/223 |
| 6,829,615 | B2 | * | 12/2004 | Schimer et al. | 707/102 |
| 7,085,830 | B1 | * | 8/2006 | Singhal et al. | 709/223 |
| 7,111,053 | B1 | * | 9/2006 | Black et al. | 709/220 |
| 2002/0032761 | A1 | * | 3/2002 | Aoyagi et al. | 709/223 |

(Continued)

OTHER PUBLICATIONS

Arciniegas. "XML structure, syntax and uses." *In XML Developer's Guide*, McGraw-Hill Osborne Media, p. 4-31 (2000).

(Continued)

*Primary Examiner*—Meng-Ai An
*Assistant Examiner*—Abdou K Seye
(74) *Attorney, Agent, or Firm*—Lahive & Cockfield, LLP (57) ABSTRACT

A user interface enables a user to concurrently select a plurality of network objects of a network object database (e.g., a MIB) from a same network device or different network devices and specify a value, only once, to which to set the selected objects. The user can initiate setting of the selected objects on the one or more devices by specifying only once that the objects on such devices be set to the specified value. The user interface, which may include a GUI, may be configured to enable the user to specify a value for a cell of a first table ("editing table"), in response to which a plurality of cells of a second table ("primary table") are set equal to the specified value. The primary table may represent a view of a network object database, each column of the view representing an object type of the network object database.

21 Claims, 7 Drawing Sheets

U.S. PATENT DOCUMENTS

2002/0161740 A1* 10/2002 Nakamura et al. ............ 707/1
2002/0161876 A1* 10/2002 Raymond .................. 709/223
2003/0028895 A1*  2/2003 Buehler et al. ............. 725/119
2003/0137532 A1*  7/2003 Proulx et al. ............... 345/735

OTHER PUBLICATIONS

Geary. "Tables." In *Graphic Java, Mastering the JFC*. 3d edition, Chapter 19, 1132-1283 (1999).

* cited by examiner

| Physical Status | Description | Logical Status | Address |
|---|---|---|---|
| down | Ethernet Frontpanel | up | 00:00:1D:70:5B:5C |
| down | Ethernet Frontpanel | up | 00:00:1D:8E:F9:19 |
| up | Fast Ethernet Frontpanel | up | 00:00:1D:70:5B:5D |
| down | Ethernet Frontpanel | up | 00:00:1D:8E:F9:1A |
| down | Ethernet Frontpanel | up | 00:00:1D:70:5B:5E |
| down | Ethernet Frontpanel | up | 00:E0:63:0B:B0:1A |
| down | Physical port et.1.1 | up | 00:E0:63:9E:84:C0 |
| up | Physical port gi.1.1 | up | 00:00:1D:24:87:19 |
| down | Physical port et.1.1 | up | 00:E0:63:0B:8A:00:B1 |
| down | Physical port et.2.1 | up | 00:E0:63:6A:00:B1 |
| up | Physical port gi.2.1 | up | 00:E0:63:8E:F9:1B |
| down | Fast Ethernet Frontpanel | up | 00:00:1D:70:5B:5F |
| down | Ethernet Frontpanel | up | 00:E0:63:0B:B0:1A |
| down | Physical port et.1.2 | up | 00:00:1D:24:87:19 |
| down | Physical port gi.1.2 | up | 00:E0:83:9E:84:C1 |
| down | Ethernet Frontpanel | up | 00:E0:63:6A:00:B1 |
| down | Physical port et.2.2 | up | 00:00:1D:8E:F9:1C |
| down | Ethernet Frontpanel | up | 00:E0:63:61:0F:86 |
| up | Physical port gi.1.1 | up | 00:E0:63:61:0F:86 |

USER INTERFACE FOR EDITING OBJECTS OF A NETWORK OBJECT DATABASE

RELATED APPLICATIONS

This application claims the benefit under 35 U.S.C. §119 (e) to commonly-owned U.S. provisional patent application Ser. No. 60/428,584, titled A GRAPHICAL USER INTERFACE FOR SPECIFYING MODIFICATIONS TO OBJECTS ON MULTIPLE NETWORK DEVICES CONCURRENTLY, filed on Nov. 22, 2002, which is hereby incorporated by reference in its entirety.

Commonly-owned U.S. patent application titled EDITING A PORTABLE, DYNAMIC AND ABSTRACT VIEW DEFINITION OF A NETWORK OBJECT DATABASE, filed on even date herewith, under Ser. No. 10/627,328 by James P. Richmond et al. ("the Richmond application") is hereby incorporated by reference in its entirety.

FIELD OF THE INVENTION

This application is directed to managing network devices on a communications network. In particular, this application describes a system and method for effecting a change for values of multiple network objects (e.g., MIB objects) of a network object database (e.g., an MIB) by specifying the change only once.

BACKGROUND

Figure 1:
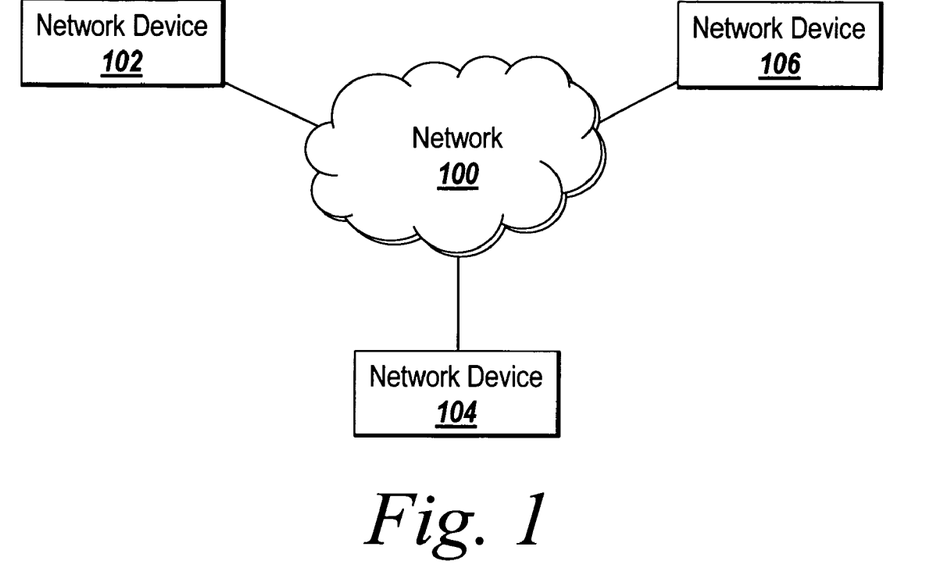
FIG. 1 is a conceptual diagram illustrating an example of a communications network.

Communications networks continue to have a growing role in today's world. FIG. 1 is a conceptual diagram illustrating an example of a communications network 100. As used herein, a "communications network" or a "network," for example, network 100, is group of two or more devices (i.e., network elements), for example, network devices 102, 104 and 106, interconnected by one or more segments of transmission media on which communications may be exchanged between the devices. Each segment may be any of a plurality of types of transmission media, including one or more electrical or optical wires or cables made of metal and/or optical fiber, air (e.g., using wireless transmission over carrier waves) or any combination of these transmission media. As used herein, "plurality" means two or more.

As networks become more complex and continue to include more network devices, the importance of efficiently managing these devices has grown. As used herein, a "network device" is a device configured as part of a network. Such network devices may be and/or include any of a variety of types of devices, including, but not limited to, switching devices, workstations, personal computers, terminals, laptop computers, end stations, servers, gateways, registers, directories, databases, printers, fax machines, telephones, transmitters, receivers, repeaters, and any combination thereof.

Managing network devices is referred to herein as "device management," and includes configuring network devices, where one or more these network devices are typically configured remotely (i.e., from another network device residing at a different location on the network) by exchanging messages (e.g., packets) between network devices over network media.

To facilitate configuring large numbers of network devices, object types often are defined to represent aspects of network devices, for example, status, location (e.g., Internet Protocol (IP) address and/or Media Access Control (MAC) address), port characteristics, device description, other aspects, permissible states of any aspects, or any combination thereof.

OBJECTS

The term "object" is often used inconsistently in the field of communications networks, including the field of device management. The meaning of the term "object" and related terms as used herein will now be defined.

As used herein, an "object" is an abstraction representing a specific occurrence (i.e., an instance) of an object type.

As used herein, an "object type" is an abstraction representing a type of thing, for example, a type of thing associated with a network device, for example, the network device itself, a Virtual Local Area Network (VLAN), an interface of the network device, any aspects thereof, other aspects, or any combination thereof.

For example, an object type may define an interface of a network device, where a specific object of the object type may be instantiated for a particular interface of a particular network device.

An object type may include one or more other object types and may be included within one or more other object types. Accordingly, an object type may define interrelationships between object types and may define an organizational structure of object types.

Some object types, referred to herein as "non-indexed" object types (and often referred to as zero-instanced object types), are configured such that only a single object of the object type can occur (i.e., can be instantiated) per network device. For example, an object type may define an operating system for a network device, for which only a single object occurs for each network device.

Other object types, referred to herein as "indexed" object types are configured such that one or more objects of the object type may occur for a single network device. In such case, where one or more objects of a same object type may occur for a single device, each object may be referred to as an "occurrence" (i.e., an instance) of the object type, and each occurrence may be indexed by an indexing variable. For example, an object type defining an interface of a network device may have one or more objects occur per network device, and each of these objects may be referred to as an occurrence of the object type, i.e., an occurrence of an interface. Further, the interface object type may be defined to include several other object types, and each such object type may occur one or more times on a network device, i.e., once for every occurrence of the interface object type.

Network Object Database

A plurality of objects may be grouped together to form a network object database. As used herein, a "network object database" is an organized collection of one or more network objects.

As used herein, a "network object" is an object representing a specific occurrence (i.e., an instance) of an network object type. A "network object type" is an object type representing a type of thing associated with a network device, for example, the network device itself, a Virtual Local Area Network (VLAN), an interface of the network device, any aspects thereof, other aspects, or any combination thereof.

An example of a network object database is a Management Information Base (MIB). A network object database may be any of a variety of types of databases, for example, an object-oriented database, a flat file database, a relational database, or combination thereof. Some network object databases organize network object types into object type groups and/or tables, where the database schema of such database may divide several logically-related object types into several tables and/or object type groups. For example, some MIBs include an interface group, a system group, and/or a VLAN group, etc. A device management application may be configured to understand such relationships, and a programmer or other person experienced in working with the database may know such relationships. Typically, however, a user (e.g., a network administrator) has limited knowledge or understanding of the relationships between such tables and table entries.

An indexed object type (e.g., an interface) of a network object database (e.g., a MIB) may include a table object type defining a table for the indexed object type. The table object type includes an object type that defines an indexing variable for the table and other object types that define columns for the table. The table object type may be defined such that each occurrence of the indexed object type is indexed by the indexing variable and may be considered an entry or row of the table. The column object types may be defined to occur once for each occurrence of the indexed object type, i.e., once for each entry or row of the table.

To facilitate the widespread use of network object databases to manage devices, several technologies, standards and protocols have been developed. Some of these standards have been developed to define a language for structuring management information, including the Structure of Management Information (SMI) promulgated by the Internet Engineering Task Force (IETF), including IETF Standard No. 16, which defines Version 1 of the SMI as documented in Request for Comments (RFCs) 1155 and 1212, and IETF Standard No. 58, which defines Version 2 of the SMI as documented in RFCs 2578, 2579 and 2580.

Other protocols have been developed to enable a user to manage objects and object types of a network object database (e.g., a MIB). Managing a database of network objects may include accessing (e.g., remotely) and manipulating (e.g., getting and setting) object types and occurrences thereof, including modifying a definition of an object type and/or changing a value defined for an object. An example of a protocol for managing a MIB is the Simple Network Management Protocol (SNMP) promulgated by the IETF. There are several different versions of SNMP, including SNMPv1 (version 1) as defined by IETF Standard No. 15 and documented in RFC 1157, SNMPv2c, which is not a standard, but is an experimental version of SNMP as documented in RFC 1901, and SNMPv3 defined by IETF Standard No. 62 and documented in RFCs 3410-3418, which are updated versions of RFCs 1905-1907 and 2570-2575.

Accordingly, a network object database, for example, a MIB, may be configured to conform with one or more of the SMI protocols and one or more of the SNMP protocols. A network object database also may include proprietary elements that do not conform with any standards or protocols.

Network Device Management

Managing network devices typically includes remotely setting values of objects on network devices. A network device management application, for example, NetSight Element Manager, version 3.0.0, available from Enterasys Networks, Inc. of Rochester, New Hampshire ("NetSight Element Manager"), may provide a user a view of a network object database to assist a user (e.g., a network administrator) to remotely manage network devices.

As used herein, a "view" of a network object database (e.g., MIB) is a visual representation of information derived from the network object database. The visually represented information may be any information derived from the network object database, for example, the values of one or more objects on a network device. A view typically represents a subset of the information available from a network object database, and typically is used by a user to determine the state of one or more network objects on one or more devices. As used herein, a "view definition" is a set of computer-readable signals that defines a view. As used herein, a "set" of items may include one or more of such items.

A view definition includes a definition of the information to be represented and may provide a layer of abstraction of network objects beyond the layer of abstraction provided by the network object database itself. A view definition may specify information beyond the information defined in the network object database, for example, different names for the objects than the names provided by the network object database. Further, a view definition may include a definition of a visual arrangement of the information to be represented. Thus, a view definition may define a visual arrangement (e.g., a table) of objects that is different than the visual arrangement defined by the network object database.

Some device management applications, for example, NetSight Element Manager, provide a user interface that enables a user to select a network device, for example, by selecting the network device from a list or alternatively, if no list is provided, specifying a network device, for example, by entering an IP address or other identifier of the network device. The user then may enter values for one or more objects, one object at a time. For example, the user interface may present a group of fields. In each field, the user may enter text or select from a menu. Even if one or more of the objects have a same object type, the user must separately enter values for the objects.

When the use is done entering values for the group, the application then sends one or more messages (e.g., SNMP "set" messages) to the network device to set the values for the objects of the group equal to the values entered by the user.

This process of selecting a network device, specifying values for one or more object one object at a time and then sending messages to the network device to set the values of the one or more objects may be repeated for other network devices.

SUMMARY

A problem with existing device management applications is that setting values for objects on network devices must be performed one network device at a time. Further, for each network device, entering values for objects, even objects of a same object type, must be performed one object at a time. As described above, for each network object to be edited, a user must separately select the device, specify values for one or more object one at a time and then send one or more messages to the network device to update the objects. This process becomes redundant if a user desires to set a same value for a plurality of objects on a same network device or on different network devices, including objects of a same object type. This redundancy increases as the number of objects for which the same value is set increases.

Accordingly, in an aspect of the invention, a user concurrently selects a plurality of objects from a same network device or different network devices and specifies a value, only once, to which to set the selected objects. In another aspect, a user interface is provided that enables the user to make such concurrent selections and specify such values only once.

In another aspect, the user initiates a setting of the selected objects on the one or more devices by specifying only once that the objects on such devices be set to the specified value.

In another aspect, a user interface, which may include a GUI, is provided that enables a user to specify a value for a cell of a first table ("editing table"), in response to which a plurality of cells of a second table ("primary table") are set equal to the specified value. Each cell in the primary table may represent an object of a first object type residing on a network device. The primary table may represent a view of a network object database, where each column of the view represents an object type of the network object database.

In such aspect, each row of the primary table represents an occurrence of an object on a network device, for example, a Virtual Local Area Network (VLAN) or an interface. Each cell of a row may hold a value of an object included as part of the object represented by the row. The object corresponding to a cell may be of the object type represented by the column in which the cell resides. The primary table may be edited (e.g., created and/or modified) as described in the Richmond application.

In aspects of the invention, the editing table includes a single row, and each cell in the row corresponds to a respective column of the primary table. A user can select one or more rows from the primary table, and then enter a value in a first cell of a first column of the editing table. In response, for each selected row of the primary table, a cell in a column of the row corresponding to the first column is set equal to the entered value.

In aspects of the invention, the object represented by each edited cell of the primary table then is updated. For example, if each edited cell (and each row that includes an edited cell) of the primary table represents an object on a network device, one or more messages (e.g., SNMP "set" messages) may be sent to each network device on which one of the objects resides. Each such message may specify to set the value of the object equal to the value specified by the user.

Accordingly, in aspects of the invention, a user interface is provided that enables a user to effect changes to objects on one or more network devices by specifying a value for such objects only once, for example, in a cell of an editing table.

In aspects of the invention, each cell of the editing table may be configured with an editing control. The type of editing control (e.g., combobox, textbox, radio buttons, etc.) may be determined based on the data type of the primary table column corresponding to the cell. The data type of a primary table column may be a data type defined for an object type represented by such column. Accordingly, the editing table may be configured, for each cell, to implement an appropriate editing control to enable the user to enter and/or select a value for the cell. For example, if a data type for a column is an enumerated data type, a set of possible values for the data type may be accessible by the user interface, which may include a GUI. Accordingly, the user interface may configure the corresponding column of the editing table with an appropriate editing control, e.g. a combobox, for enabling the user to select one of the possible values for the enumerated object type.

In an embodiment of the invention, a user is enabled to set a value for a plurality of network objects on a communications network. A user interface is provided that enables the user to indicate a first value for which to set the plurality of network objects by specifying the first value only once. In response to receiving an instruction from the user, setting a value of each of the plurality of network objects equal to the first value is initiated.

This embodiment and/or aspects thereof may be implemented as a computer program product that includes a computer-readable medium and computer-readable signals stored on the computer-readable medium, which signals define appropriate instructions. These instructions, as a result of being executed by a computer, instruct the computer to perform the acts described above for this illustrative embodiment.

In another embodiment, a system is provided for enabling a user to set a value for a plurality of network objects on a communications network. The system includes means for enabling the user to indicate a first value for which to set the plurality of network objects by specifying the first value only once. The system also includes a message component to initiate setting a value of each of the plurality of network objects equal to the first value.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

BRIEF DESCRIPTION OF THE DRAWINGS

FIGS. 4 and 5 are screen shots illustrating an example of a display presented by a GUI that enables a user to set a value for one or more cells in a primary table by specifying the value in a cell of an editing table;

DETAILED DESCRIPTION

The function and advantage of aspects of the present invention will be more fully understood from the examples described below. The following examples are intended to facilitate an understanding of aspects of the invention and to illustrate the benefits of such aspects, but do not exemplify the full scope of such aspects.

Although aspects of the invention described herein are described primarily in relation to defining values for objects of a network object database, aspects of the invention are not limited thereto, but may be applied to define values for any type of object, parameter, variable, etc.

Aspects of the invention described herein may be implemented using NetSight Atlas Console available from Enterasys Networks, Inc. of Rochester, N.H.

As used herein, whether in the written description or the claims, the terms "comprising", "including", "carrying", "having", "containing", "involving", and the like are to be understood to be open-ended, i.e., to mean including but not limited to.

EXAMPLES

Figure 2:
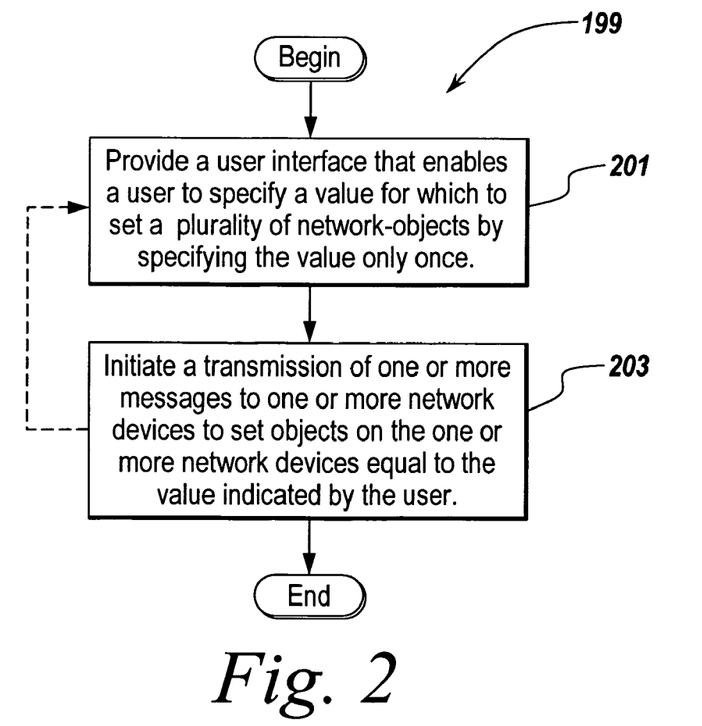
FIG. 2 is a flow chart illustrating an example of a method of enabling a user to set values for a plurality of objects of a network object database by specifying the value only once.

FIG. 2 is a flow chart illustrating an example of a method 199 of enabling a user to set values for a plurality of objects of a network object database (e.g., a MIB) on a network by specifying the value only once. Although methods 199 and 200 (described below) are described herein primarily in relation to setting values for network objects, aspects of the invention are not limited to setting values for network objects, as either of methods 199 and 200 may be applied to set values for any types of parameters or objects.

In Act 201, a user interface may be provided that that enables the user to specify a first value for which to set the plurality of network objects by specifying the first value only once. The user interface may include a visual user interface, for example, a GUI.

As used herein, a "user interface" is an application or part of an application (i.e., a set of computer-readable instructions) that enables a user to interface with an application during execution of the application. A user interface may include code defining how an application outputs information to a user during execution of the application, for example, visually through a computer screen or other means, audibly through a speaker of other means, and manually through a game controller or other means. Such user interface also may include code defining how a user may input information during execution of the application, for example, audibly using a microphone or manually using a keyboard, mouse, game controller, track ball, touch screen or other means.

As used herein, a "visual user interface" is the portion of the user interface that defines how information is visually presented (i.e., displayed) to the user, and defines how the user can navigate the visual presentation (i.e., display) of information and input information in the context of the visual presentation. During execution of the application, the visual interface controls the visual presentation of information and enables the user to navigate the visual presentation and enter information in the context of the visual presentation. Types of visual user interfaces range from command-driven interfaces, where users type commands, menu-driven interfaces, where users select information from menus, and combinations thereof, to GUIs, which typically take more advantage of a computer's graphics capabilities, are more flexible, intuitive and easy to navigate and have a more appealing "look-and-feel" than command-driven and menu-driven visual user interfaces.

As used herein, the visual presentation of information presented by a user interface, visual user interface or GUI is referred to as a "user interface display", "visual user interface display" or a "GUI display", respectively.

Figure 4:
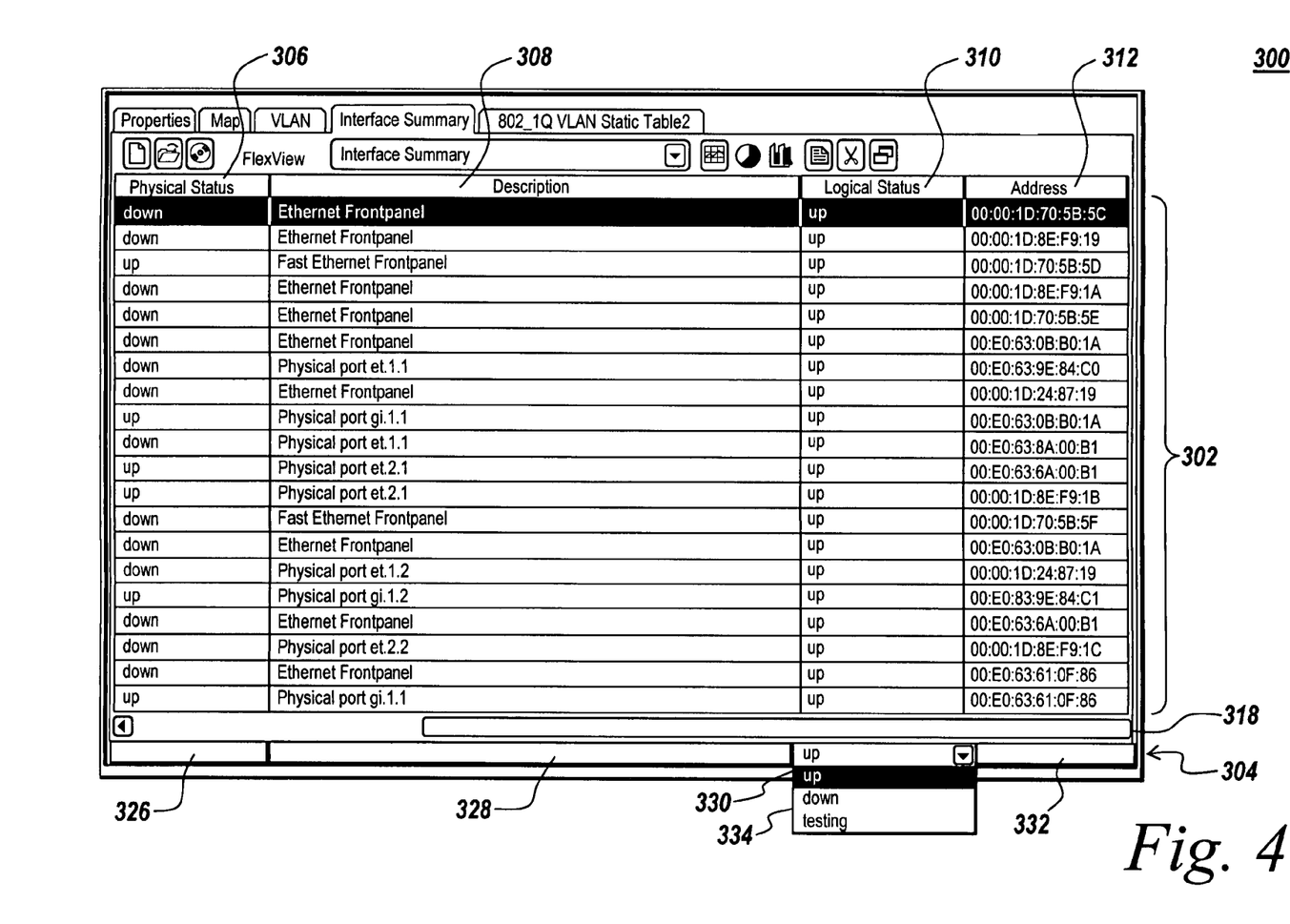

FIGS. 4 and 5 each illustrate a GUI display 300 provided by a GUI that. enables the user to specify a first value for which to set a plurality of network objects by specifying the first value only once. The GUI that provides GUI display 300 enables a user to set values for one or more cells in a primary table in response to entering a value in a cell of an editing table. GUI display 300 may include any of primary table 302 and editing table 304. The primary table 302 may include columns 306, 308, 310 and 312 and editing table may include corresponding columns 326, 328, 330 and 332, respectively.

To facilitate an understanding of aspects of the invention, methods 199 and 200 are described with reference to GUI display 300. It should be appreciated, however, that any of a variety of types of user interface displays, including those provided by other types of visual user interfaces, may be used to enable a user to specify a first value for which to set the plurality of network objects by specifying the first value only once and/or to set values in one or more cells of a primary table by entering a value in a cell of an editing table.

Returning to method 199, Act 201 may be implemented in any of a variety of ways, and may include presenting GUI display 300 and/or performing method 200 described below in relation to FIGS. 3A and 3B.

In Act 203, one or more messages may be transmitted to one or more network devices on which reside one or more of the objects for which a value was defined. The messages may be transmitted to set the values of the objects equal to the value specified by the user. The one or more messages may be SNMP messages and the one or more objects may be MIB objects.

Accordingly, if a device has more than one object resident thereon, and the user wants to make the same change to the plurality of these objects, the user need only specify the change once and initiate transmission of a message only once. Thus, Act 203 may include initiating the transmission of one or more messages to a single network device, thereby updating the values for one or more objects on this single device.

Further, Act 203 may include initiating transmission of one or more messages to multiple network devices, thereby changing the values of objects on multiple devices. Accordingly, if one or more objects of the same object type reside on a plurality of network devices and the user wants to make the same change to a plurality of these objects, the user need only specify the change once and initiate transmission of one or more messages to the one or more network devices only once.

Acts 201 and 203 may be may be repeated as desired by a user.

Figure 3A:
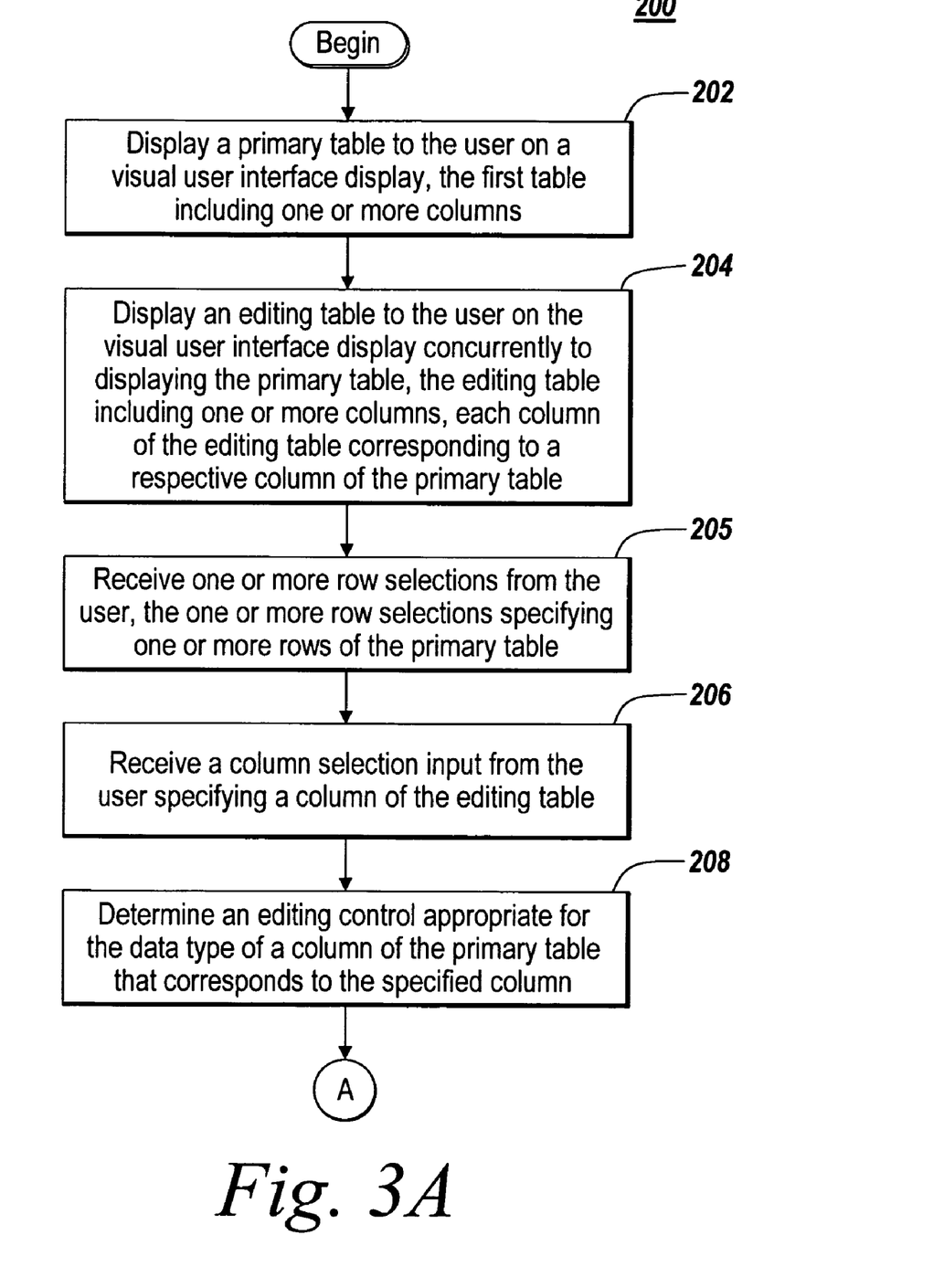
FIGS. 3A and 3B comprise a flow chart illustrating an example of a method of enabling a user to set a value for one or more cells in a primary table by specifying the value in a cell of an editing table.
Figure 3B:
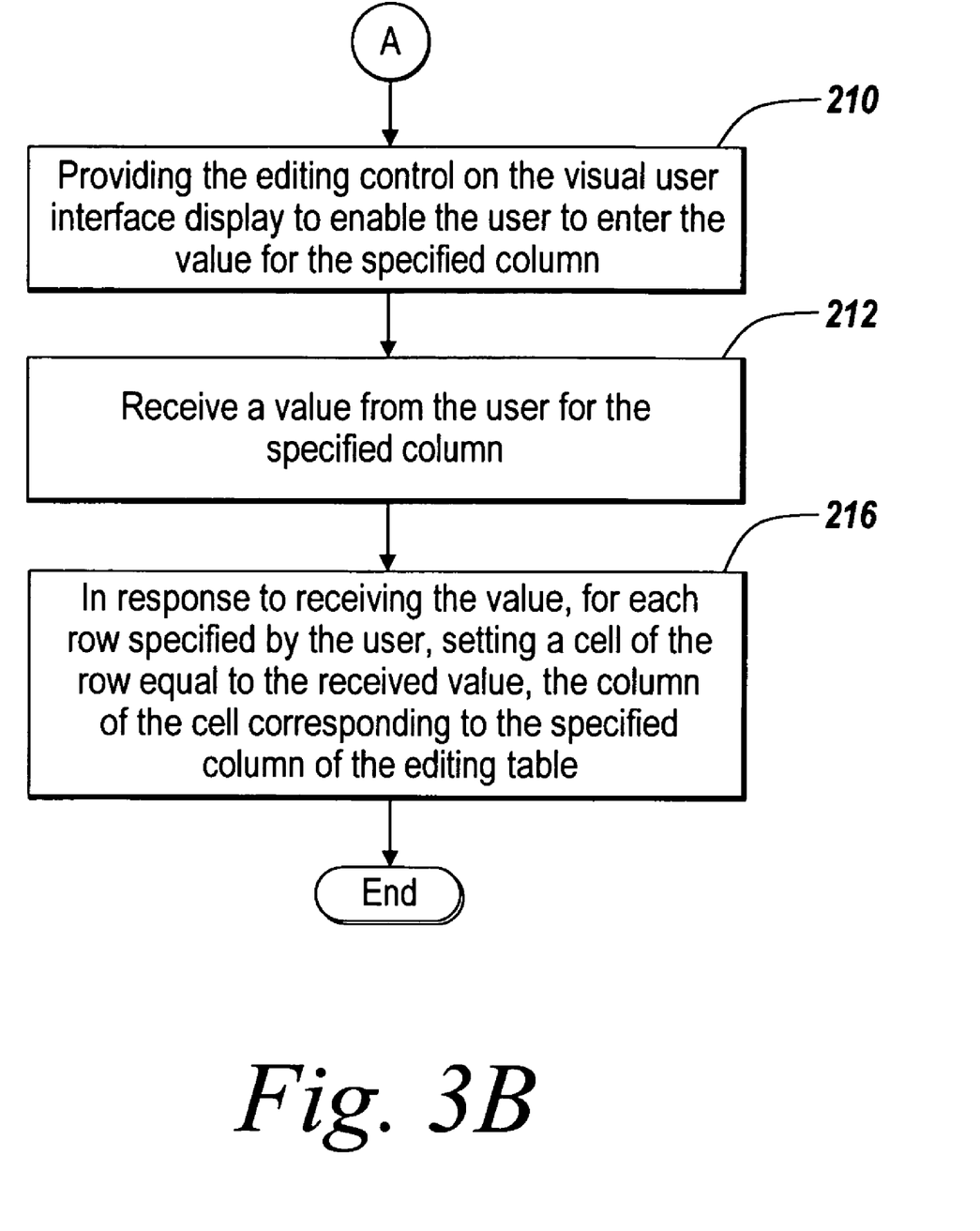

FIGS. 3A and 3B comprise a method of enabling a user to specify a value in a cell of an editing table in response to which one or more cells of a primary table are set to such value.

In Act 202, a primary table (e.g., table 302) may be displayed to the user on a visual user interface display, e.g., a GUI display such as GUI display 300, where the primary table includes one or more columns. In an aspect of the invention, each of the one or more columns of the primary table represents an object type of a network object database (e.g., MIB) and the primary table represents a view of the network object database. Each object type may be an object type specified by a standard or protocol or may be a proprietary object type. For example, an object type may be one of the object types disclosed in the Richmond application. Each object type may be of a particular data type (e.g., string, number, Boolean, etc.), which may be a data type defined in accordance with a standard, for example, Abstract Syntax Notation 1 (ASN. 1). The definitions of the object types and data types associated with the columns of the table, and other information associated with the columns and the table itself may be accessible, for example, on a computer-readable medium located locally (e.g., on the same device on which method 200 is being employed) or remotely (e.g., on a different network device than the device on which method 200 is being employed).

When each of the one or more columns of the primary table represents an object type of a network object database, each row of the primary table may represent an occurrence of an object (e.g., an interface or a VLAN) on a network object device. For example, each row may represent an occurrence of one of the objects disclosed in the Richmond application. Each cell in the row may store a value of an object of the object type represented by the column for the occurrence of the object represented by the row. For example, the row may represent an occurrence of an interface object, and a column may represent a physical status object type. The value stored in a cell common to such row and column may represent the physical status of the interface occurrence represented by the row.

In Act 204, an editing table (e.g., table 304 of GUI display 300) may be displayed to the user on the visual user interface display, concurrently to displaying the primary table. The editing table may include one or more columns, where each column corresponds to a respective column of the primary table. The editing table may be configured to include a number of columns equal to the number of columns of the primary table.

Act 204 may include vertically aligning each column of the editing table with its corresponding column from the primary table. Vertically aligning the columns as such may assist the user in understanding the correspondence between columns of the editing table and columns of the primary table. As illustrated by table 304, the editing table may have only a single row.

To assist the user in navigating the primary table and editing table, and to further the user's understanding of the correspondence between columns of the editing table and columns of the primary table, method 200 also may include displaying a scroll bar on the visual user interface display (e.g., scroll bar 318 of GUI display 300) that is shared between the editing table and the primary table. Such scroll bar may scroll in a horizontal direction, parallel to the rows of both tables and orthogonal to the columns of both tables.

In Act 205, one or more row selections may be received from the user. Each of the row selections may specify a row of the primary table. For example, the user may select such rows by navigating a mouse over a first row and clicking and dragging over several rows or by using other user input devices, for example, by using a combination of keys on a keyboard.

In Act 206, a column selection input may be received from the user, the input specifying a column of the editing table. For example, the GUI presenting GUI display 300 may enable a user to navigate a mouse over one of columns 326, 328, 330 or 332 and click on the column, or enable the user to select from the columns using another input device, for example, a keyboard.

In an aspect of method 200, it may be determined whether values are allowed to be set for the cells of the primary table corresponding to the column of the editing table specified in Act 206. For example, one or more columns of primary table 302 may be configured to be read-only such that values may not be set for such columns. For example, one or more columns may represent an object type of a database that is defined to be read-only. Further, certain users may not be allowed to set values for certain columns, and method 200 may be configured to determine whether a user is allowed to edit values for a column. Thus, method 200 may include, in response to Act 206, not allowing certain columns from the editing table to be selected and/or displaying a notification to the user that such column may not be selected.

In Act 208, an appropriate editing control for the specified column may be determined. For example, the appropriate editing control may be determined based on the data type of a column of the primary table that corresponds to the specified column of the editing table. As described above, information corresponding to a column of the primary table may be accessible and this information may include the data type corresponding to the column. In an aspect of method 200, each column represents an object type of a network object database and the data type is the data type of the object type.

The data type of a column may be an enumerated data type where any of several enumerated values are possible for a cell of the column. These enumerated values may be included in the accessible information corresponding to the column. Accordingly, an appropriate editing control, for example, a combobox, test box or radio button, for an enumerated data type may be determined. In GUI display 300, combobox 334 is provided for column 330 of editing table 304 because the data type of column 310 is an enumerated data type having possible values of "up", "down" or "testing".

Because the data type corresponding to a column and the appropriate editing control for the data type may be determined automatically, a user doesn't have to know the data type associated with the column nor the particular editing control needed for a particular data type.

In Act 210, the editing control may be provided on the visual user interface display to enable the user to enter a value for the specified column of the editing table. In GUI display 300, combobox 334 is provided for column 330 of editing table 304 because the data type of column 310 is an enumerated data type.

In Act 212, a value may be received from the user for the specified column. For example, the user may enter a value or select a value from among a list of enumerated values for the column. For example, in FIG. 5, the user selected the value "testing" for column 330 from among the values listed in combobox 334.

In Act 216, for each row of the primary table specified by the user in Act 205, a cell of a column of the row may be set equal to the value received from the user. This column of the primary table corresponds to the column of the editing table specified in Act 206. For example, referring to FIG. 5, rows 402 of table 302 were selected by the user, and, for each of rows 402, the value "testing" (selected by the user from combobox 334) has been applied to the cell for column 310.

After the cells of one or more rows have been set equal to the user-specified value, the rows for which the value was set may be emphasized to the user, for example, by highlighting the row in a color or grayscale value, or by using any of a variety of other graphical techniques.

It should be appreciated that although GUI display 300 is illustrated as including primary table 302 and editing table 304, a visual user interface display such as GUI display 300 may be configured with a control that enables a user to toggle between hiding and displaying editing table 304. Accordingly, if a user desires merely to view information in the primary table (e.g., table 302), but not to edit any such information, the user may hide the editing table (e.g., table 304). Further, a visual user interface display such as GUI display 300 may be configured (e.g., by a system administrator) such that it does not display an editing table for one or more users, thereby preventing one or more users from changing the values of any cells in the primary table.

In an embodiment of method 200 where the column of the primary table for which a value was defined represents an object type of a network object database, in a next act, one or more messages may be transmitted to one or more network devices on which reside one or more of the objects for which a value was defined, for example, as described above in relation to Act 203 of method 199.

Methods 199 and method 200 each may include additional acts. Further, the order of the acts performed as part of method 200 is not limited to the order illustrated in FIGS. 3A and 3B, as the acts may be performed in other orders, and one or more of the acts of method 200 may be performed in series or in parallel to one or more other acts, or parts thereof For example, Acts 206-208 and/or Act 212 may be performed before Act 205.

Method 199 is merely an illustrative embodiment of a method of enabling a user to set values for a plurality of objects of a network object database on a network by specifying the value only once. Such an illustrative embodiment is not intended to limit the scope of the invention, as any of numerous other implementations of such method, for example, variations of method 199, are possible and are intended to fall within the scope of the invention. None of the claims set forth below are intended to be limited to any particular implementation of a method of enabling a user to set values for a plurality of objects of a network object database on a network by specifying the value only once, unless such claim includes a limitation explicitly reciting a particular implementation.

Further, method 200 is merely an illustrative embodiment of a method of enabling a user to specify a value in a cell of an editing table in response to which one or more cells of a primary table are set to such value. Such an illustrative embodiment is not intended to limit the scope of the invention, as any of numerous other implementations of such method, for example, variations of method 200, are possible and are intended to fall within the scope of the invention. None of the claims set forth below are intended to be limited to any particular implementation of a method of enabling a user to specify a value in a cell of an editing table in response to which one or more cells of a primary table are set to such value, unless such claim includes a limitation explicitly reciting a particular implementation.

Methods 199 and 200, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBAL, etc., or any of a variety of combinations thereof. The computer-readable medium on which such instructions are stored may reside on one or more of the components of system 500 and/or computer system 600, each described below, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIGS. 7 and 8, that perform the functions described above with respect to methods 199 and/or 200 can be generically considered as one or more controllers that control the above-discussed functions. The one or more controllers can be implemented in numerous ways, such as with dedicated hardware, or using a processor that is programmed using microcode or software to perform the functions recited above.

Figure 6:
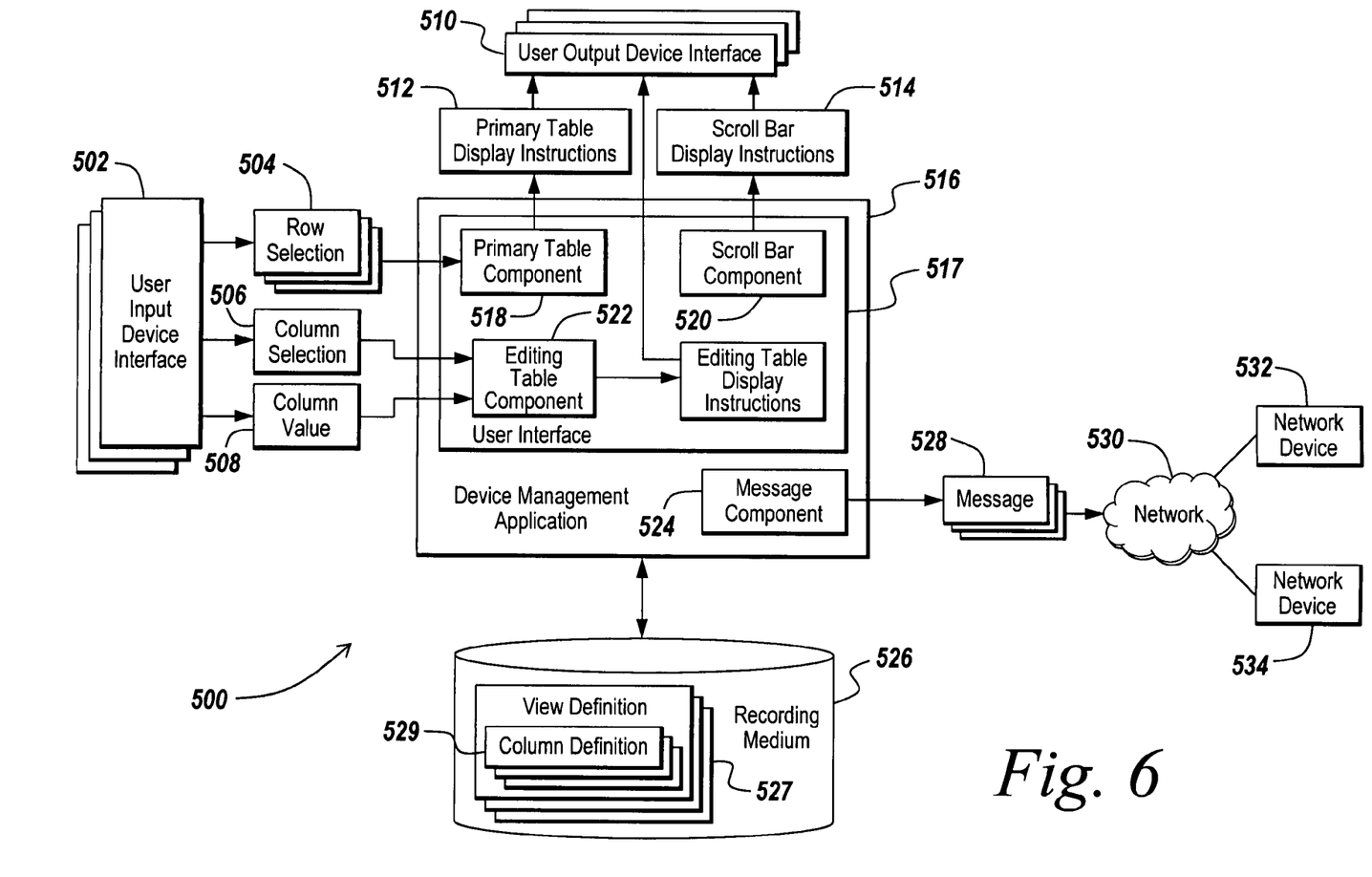
FIG. 6 is a block diagram illustrating an example of a system for enabling a user to set values for a plurality of objects of a network object database by specifying the value only once.

FIG. 6 is a block diagram illustrating an example of a system 500 for enabling a user to set values for a plurality of objects of a network object database by specifying the value only once.

System 500 may include one or more user input device interfaces 502, one or more user output device interfaces 510, device management application 516 and recording medium 526.

Each user input device interface 502 may be configured to interface with any of a variety of user input devices, including a mouse, a track ball, a keyboard, a microphone (in combination with a voice recognition application), a touch screen, other types of user input devices, or any combination thereof. Each user output device interface 510 may be configured to interface with any of a variety of user output devices, including, computer screens, speakers, game controllers, other types of visual, audio and manual devices, or any combination thereof.

Device management application 516 may include a user interface 517 that enables the user to specify a first value for which to set a plurality of network objects by specifying the first value only once. The user interface may include a visual user interface, for example, a GUI such as a GUI that presents GUI display 300.

In an embodiment, user interface 517 may be configured to display and modify values included in a table, and may include primary table component 518, scroll bar component 520 and editing table component 522.

Primary table component 518 may be configured to send primary table display instructions 512 to one or more of user output device interfaces 510 to control the display of the primary table, for example, primary table 302 of GUI display 300. Primary table component 518 may receive one or more row selections 504 from one or more of user input device interfaces 502, and may be configured to set values of cells of the selected rows equal to a value received from a user by the editing table component, as described above in relation to method 200.

In an aspect of system 500, where columns of the primary table represent object types of a network object database, primary table component 518 may be configured to retrieve one of view definitions 527, where the retrieved view definition may include one or more column definitions 529. Primary table component 518 may be configured to display the retrieved one of the view definitions 527, for example, as a primary table.

Editing table component 522 may be configured to send editing table display instructions 512 to one or more of user output device interfaces 510 to control the display of the editing table, for example, editing table 304 of GUI display 300. Editing table component 522 may be configured to receive column selection input 506 that specifies a column of the editing table and column value input 508 which specifies a value for the specified column of the editing table. Editing table component 522 may be configured to control the primary table component to set cells of the selected rows corresponding to the specified column of the editing table equal to the specified value for the specified column, for example, as described above in relation to method 200.

Scroll bar component 520 may be configured to send scroll bar display instructions 514 to one or more of user output device interfaces 510 to control the display of a scroll bar, for example, a scroll bar shared between the primary table and the editing table such as scroll bar 318 of GUI display 300, as described above in relation to method 200.

In an embodiment of system 500, device management application 516 may include message component 524. Message component 524 may be configured to control the sending of one or more messages 528 to one or more network devices 532 and 534 across network 530. Each message 528 may include the value specified by the user and may be configured to control the setting of objects on the one or more network devices 532 and 534 equal to the specified value. The one or more objects may be included in the user-specified rows. Further, each object may be of the object type represented by the column of the primary table corresponding to the user-specified column of the editing table.

System 500, and components thereof such as device management application 516, user interface 517, primary table component 518, editing table component 522, scroll bar component 520 and message component 524, may be implemented using software (e.g., C, C#, C++, Java, or a combination thereof), hardware (e.g., one or more application-specific integrated circuits), firmware (e.g., electrically-programmed memory) or any combination thereof. One or more of the components of system 500 may reside on a single system, or one or more components may reside on separate, discrete systems. Further, each component may be distributed across multiple systems, and one or more of the systems may be interconnected.

Further, on each of the one or more systems that include one or more components of system 500, each of the components may reside in one or more locations on the system. For example, different portions of the components may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 500 may be implemented on a computer system 600 described below in relation to FIGS. 7 and 8.

System 500 is merely an illustrative embodiment of a system for enabling a user to set values for a plurality of objects of a network object database by specifying the value only once. Such an illustrative embodiment is not intended to limit the scope of the invention, as any of numerous other implementations of such system, for example, variations of system 500, are possible and are intended to fall within the scope of the invention. None of the claims set forth below are intended to be limited to any particular implementation of a system for enabling a user to set values for a plurality of objects of a network object database by specifying the value only once, unless such claim includes a limitation explicitly reciting a particular implementation.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to enable a user to specify a value in a cell of an editing table in response to which one or more cells of a primary table are set to such value according to various embodiments of the invention. Further, the software design system may be located on a single computer or may be distributed among a plurality of computers attached by a communications network.

A general-purpose computer system according to one embodiment of the invention is configured to enable a user to specify a value in a cell of an editing table in response to which one or more cells of a primary table are set to such value. It should be appreciated that the system may perform other functions, and the invention is not limited to having any particular function or set of functions.

For example, various aspects of the invention may be implemented as specialized software executing in a general-purpose computer system 600 such as that shown in FIG. 6. The computer system 600 may include a processor 603 connected to one or more memory devices 604, such as a disk drive, memory, or other device for storing data. Memory 604 is typically used for storing programs and data during operation of the computer system 600. Components of computer system 600 may be coupled by an interconnection mechanism 605, which may include one or more busses (e.g., between components that are integrated within a same machine) and/or a network (e.g., between components that reside on separate discrete machines). The interconnection mechanism 605 enables communications (e.g., data, instructions) to be exchanged between system components of system 600. Computer system A00 also includes one or more input devices 602, for example, a keyboard, mouse, trackball, microphone, touch screen, and one or more output devices 601, for example, a printing device, display screen, speaker. In addition, computer system 600 may contain one or more interfaces (not shown) that connect computer system 600 to a communication network (in addition or as an alternative to the interconnection mechanism 605.

Figure 8:
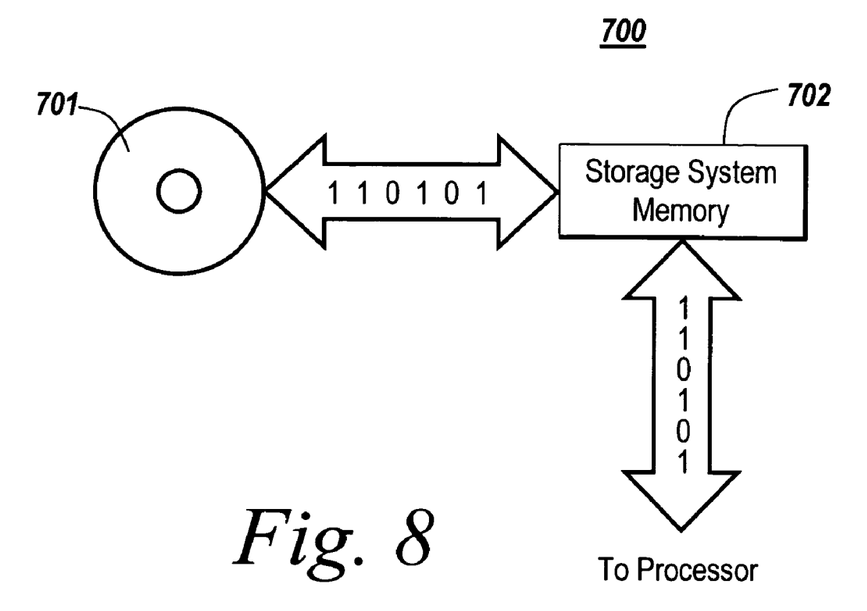
FIG. 8 is a block diagram illustrating an example of a memory system of a computer system on which aspects of the invention may be implemented.

The storage system 606, shown in greater detail in FIG. 8, typically includes a computer readable and writeable nonvolatile recording medium 701 in which signals are stored that define a program to be executed by the processor or information stored on or in the medium 701 to be processed by the program. The medium may, for example, be a disk or flash memory. Typically, in operation, the processor causes data to be read from the nonvolatile recording medium 701 into another memory 702 that allows for faster access to the information by the processor than does the medium 701. This memory 702 is typically a volatile, random access memory such as a dynamic random access memory (DRAM) or static memory (SRAM). It may be located in storage system 606, as shown, or in memory system 604, not shown. The processor 603 generally manipulates the data within the integrated circuit memory 604, 702 and then copies the data to the medium 701 after processing is completed. A variety of mechanisms are known for managing data movement between the medium 701 and the integrated circuit memory element 604, 702, and the invention is not limited thereto. The invention is not limited to a particular memory system 604 or storage system 606.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Figure 7:
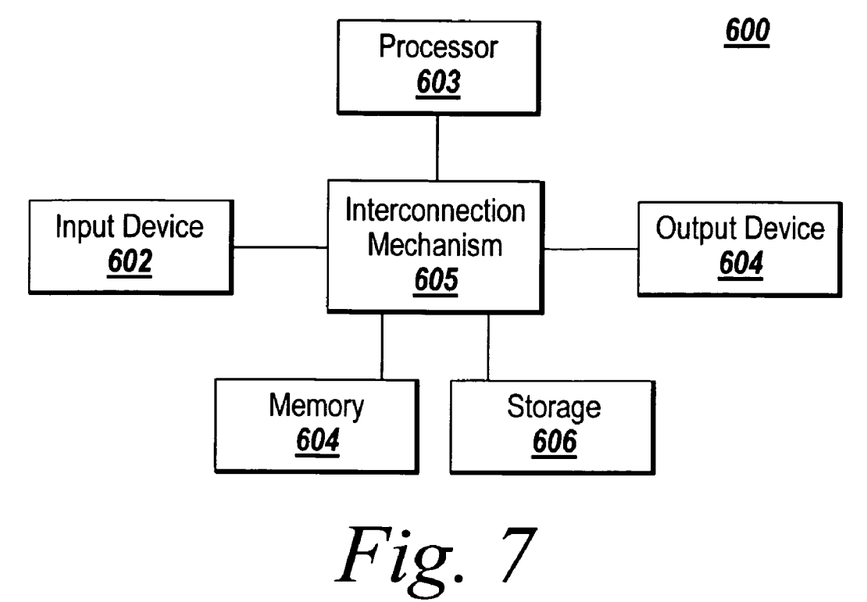
FIG. 7 is a block diagram illustrating an example of a computer system on which aspects of the invention may be implemented.

Although computer system 600 is shown by way of example as one type of computer system upon which various aspects of the invention may be practiced, it should be appreciated that aspects of the invention are not limited to being implemented on the computer system as shown in FIG. 7. Various aspects of the invention may be practiced on one or more computers having a different architecture or components that that shown in FIG. 7.

Computer system 600 may be a general-purpose computer system that is programmable using a high-level computer programming language. Computer system 600 also may be implemented using specially programmed, special purpose hardware. In computer system 600, processor 603 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of enabling a user to set a value across a plurality of network objects representing one or more portions of a plurality of different network device types on a communications network, the method comprising acts of:

(A) providing a user interface that enables the user to indicate a user-specified value for which to set the plurality of network objects representing the one or more portions of the plurality of different network device types by specifying the user-specified value only once, wherein the act of providing a user interface comprises the acts of:

(1) concurrently displaying values of network objects on a display by displaying a first table to a user on the display, the first table including a plurality of rows and at least a first column representing a first object type of the plurality of network objects representing the one or more portions of the plurality of different network device types, each of plurality of the rows including a cell for the first column that stores a value for one of the plurality of network objects representing the one or more portions of the plurality of different network device types;

(2) receiving user input that specifies a plurality of rows of the first table to concurrently select a set of the plurality of network objects representing the one or more portions of the plurality of different network device types, the set of the plurality of network objects having the value the user desires to set to the user-specified value;

(3) displaying a second table to the user on the display concurrently to displaying the first table, the second table including one or more columns, each column of the second table corresponding to the first column of the first table;

(4) receiving the user-specified value from the user for a column of the second table that corresponds to the first column of the first table;

(5) in response to receiving the value from the user, for each of the plurality of rows, setting the cell for the column of the first table equal to the received value; and (B) in response to receiving an instruction from the user, initiating setting the object value of each member of the set of the plurality of network objects representing the one or more portions of the plurality of different network device types equal to the user-specified value.

2. The method of claim 1, wherein a first network object of the plurality of network objects representing the one or more portions of the plurality of different network device types resides on a first network device and a second network object of the plurality of network objects representing the one or more portions of the plurality of different network device types resides on a second network device,
   wherein act (B) comprises initiating a transmission of a first message, destined for the first network device, configured to set a value of the first network object to the user-specified value, and initiating a transmission of a second message, destined for the second network device, configured to set a value of the second network object to the user-specified value.

3. The method of claim 2, wherein the first network device is a different network device than the second network device.

4. The method of claim 1, wherein the user interface includes a graphical user interface.

5. The method of claim 1, wherein the first object type has a first data type, and act (A) further comprises acts of:
   (6) determining an editing control appropriate for the first data type; and
   (7) providing the editing control on the display to enable the user to enter the user-specified value for the specified column.

6. The method of claim 1, wherein the second table includes only a single row.

7. The method of claim 1, wherein act (A) further comprises:
   (6) displaying a scroll bar on the display, the scroll bar shared by the first table and the second table.

8. The method of claim 7, wherein act (A)(3) includes:
   displaying the second table at a position on the display such that each column of the second table is vertically aligned on the display with its corresponding column of the first table.

9. The method of claim 1, wherein act (A)(3) includes:
   displaying the second table at a position on the display such that each column of the second table is vertically aligned on the display with its corresponding column of the first table.

10. The method of claim 1, wherein the value comprises a common value across the plurality of network objects representing the one or more portions of the plurality of different network device types.

11. A computer system for enabling a user to set a value across a plurality of network objects representing the one or more portions of the plurality of different network device types on a communications network, the system comprising:
    a processor; and
    a memory storing instructions for:
        providing a user interface to enable the user to indicate a user-specified value for which to set the plurality of network objects representing the one or more portions of the plurality of different network device types by specifying the user-specified value only once, wherein the user interface is operable to control concurrently displaying values of network objects, including values of the plurality of network objects representing the one or more portions of the plurality of different network device types, to the user, and wherein the user interface includes:
            a first table component to control displaying a first table to a user on a display, the first table including a plurality of rows and at least a first column representing a first object type of the plurality of network objects representing the one or more portions of the plurality of different network device types, each of plurality of the rows including a cell for the first column that stores a value for one of the plurality of network objects representing the one or more portions of the plurality of different network device types, and
            a second table component to control displaying a second table to the user on the display concurrently to displaying the first table, the second table including one or more columns, each column of the second table corresponding to a respective one of the columns of the first table, and operable to receive the user-specified value from the user for a column of the second table that corresponds to the first column of the first table; and
        providing a message component to initiate setting the value of each member of the set of the plurality of network objects representing the one or more portions of the plurality of different network device types equal to the user-specified value;
        receiving user input to concurrently select a set of the plurality of network objects representing the one or more portions of the plurality of different network device types, the set of the plurality of network objects having a value the user desires to set to the user-specified value, wherein the first table component is operable to receive the one or more user inputs that specify a plurality of rows of the first table; and
        receiving the user-specified value from the user for the set of the plurality of network objects representing the one or more portions of the plurality of different network device types, wherein the second table component is operable, in response to receiving the user-specified value from the user, to control the first table component to set the cell in the first column in each of the plurality of rows equal to the received user-specified value.

12. The system of claim 11, wherein a first network object of the plurality of network objects representing the one or more portions of the plurality of different network device types resides on a first network device and a second network object of the plurality of network objects representing the one or more portions of the plurality of different network device types resides on a second network device,
    wherein the message component is operable to initiate a transmission of a first message, destined for the first network device, configured to set a value of the first network object to the user-specified value, and to initiate a transmission of a second message, destined for the second network device, configured to set a value of the second network object to the user-specified value.

13. The system of claim 12, wherein the first network device is a different network device than the second network device.

14. The system of claim 11, wherein the user interface includes a graphical user interface.

15. The system of claim 11, wherein the first object type has a first data type, and wherein the second table component is operable to determine an editing control appropriate for the first data type and to provide the editing control on the display to enable the user to enter the value for the specified column.

16. The system of claim 11, wherein the second table includes only a single row.

17. The system of claim 11, wherein the user interface further comprises:
a scroll bar component to control displaying a scroll bar to the user, the scroll bar shared by the first table and the second table.

18. The system of claim 17, wherein the second table component is operable to control displaying the second table to the user at a position on the display such that each column of the second table is vertically aligned on the display with its corresponding column of the first table.

19. The system of claim 11, wherein
the second table is displayed at a position on the display such that each column of the second table is vertically aligned on the display with its corresponding column of the first table.

20. A computer-readable storage medium storing computer-readable instructions that, when executed by a processor, cause the processor to enable a user to set a value across a plurality of network objects representing the one or more portions of the plurality of different network device types on a communications network, the instructions comprising:

(A) instructions for providing a user interface that enables the user to indicate a user-specified value for which to set the plurality of network objects representing the one or more portions of the plurality of different network device types by specifying the user-specified value only once, wherein the act of providing a user interface comprises the acts of:

(1) concurrently displaying values of network objects on a display by displaying a first table to a user on the display, the first table including a plurality of rows and at least a first column representing a first object type of the plurality of network objects representing the one or more portions of the plurality of different network device types, each of plurality of the rows including a cell for the first column that stores a value for one of the plurality of network objects representing the one or more portions of the plurality of different network device types;

(2) receiving user input that specifies a plurality of rows of the first table to concurrently select a set of the plurality of network objects representing the one or more portions of the plurality of different network device types, the set of the plurality of network objects having a value the user desires to set to the user-specified value;

(3) displaying a second table to the user on the display concurrently to displaying the first table, the second table including one or more columns, each column of the second table corresponding to a respective one of the columns of the first table;

(4) receiving the user-specified value from the user for a column of the second table that corresponds to the first column of the first table;

(5) in response to receiving the value from the user, for each of the plurality of rows, setting the cell for the first column equal to the received value; and (B) instructions for, in response to receiving an instruction from the user, initiating setting the value of each member of the set of the plurality of network objects representing the one or more portions of the plurality of different network device types equal to the user-specified value.

21. A computer system for enabling a user to set a value for a plurality of network objects representing the one or more portions of the plurality of different network device types on a communications network, the system comprising:

means for enabling the user to indicate a user-specified value for which to set the plurality of network objects representing the one or more portions of the plurality of different network device types by specifying the user-specified value only once, wherein the means for enabling the user to indicate a user-specified value includes:

(1) means for concurrently displaying values of network objects on a display by displaying a first table to a user on the display, the first table including a plurality of rows and at least a first column representing a first object type of the plurality of network objects representing the one or more portions of the plurality of different network device types, each of plurality of the rows including a cell for the first column that stores a value for one of the plurality of network objects representing the one or more portions of the plurality of different network device types;

(2) means for receiving user input that specifies a plurality of rows of the first table to concurrently select a set of the plurality of network objects representing the one or more portions of the plurality of different network device types, the set of the plurality of network objects having a value the user desires to set to the user-specified value;

(3) means for displaying a second table to the user on the display concurrently to displaying the first table, the second table including one or more columns, each column of the second table corresponding to a respective one of the columns of the first table;

(4) means for receiving the user-specified value from the user for a column of the second table that corresponds to the first column of the first table;

(5) means for, in response to receiving the value from the user, for each of the plurality of rows, setting the cell for the first column equal to the received value; and a message component to initiate setting the value of each member of the set of the plurality of network objects representing the one or more portions of the plurality of different network device types equal to the user-specified value.

* * * * *